UNITED STATES PATENT OFFICE.

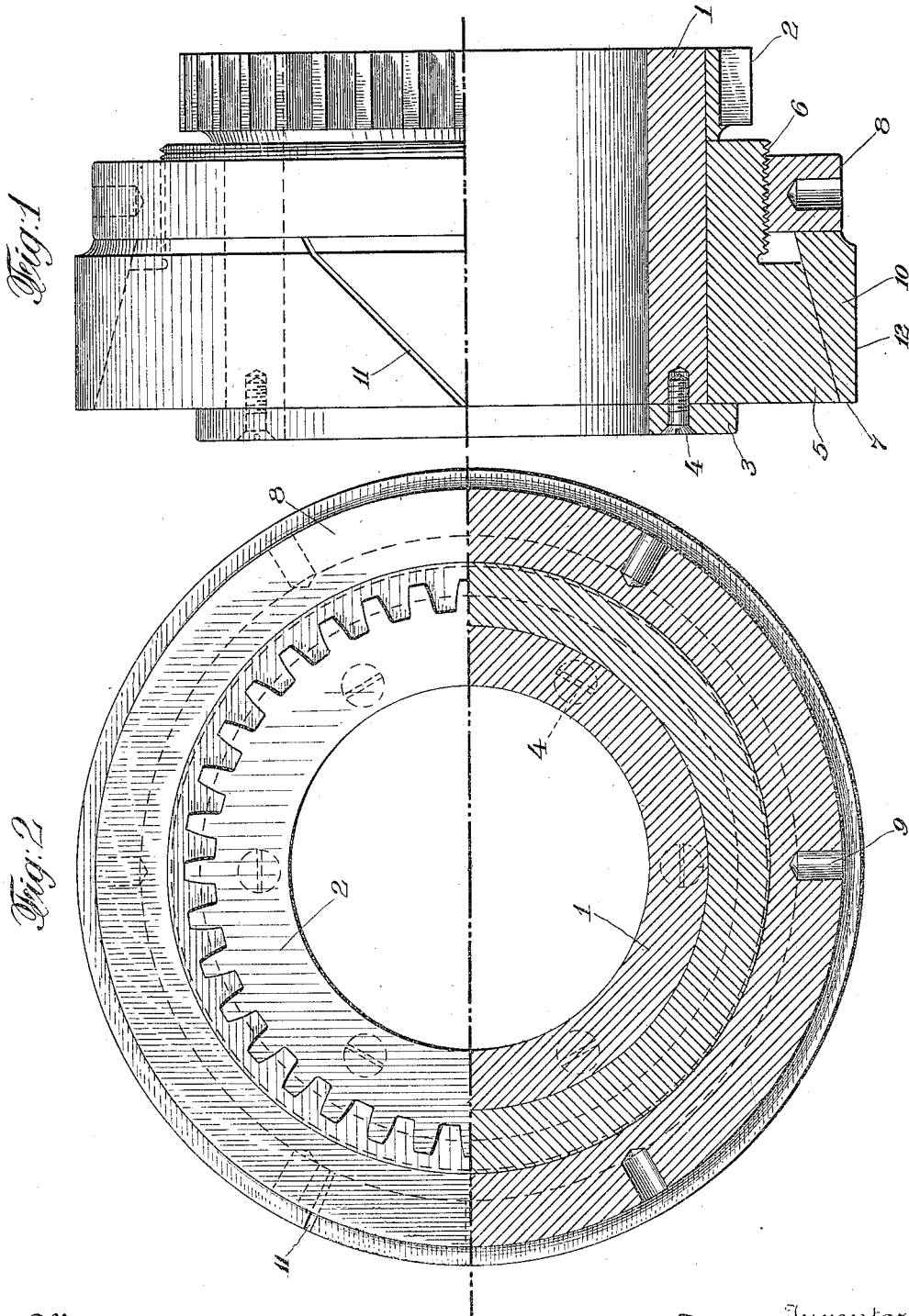

CHARLES VAN MIDDLESWORTH, OF BROOKLYN, NEW YORK, ASSIGNOR TO VAN DYCK GRAVURE COMPANY, OF NEW YORK, N. Y.

EXPANSIBLE BEARING.

962,602.  Specification of Letters Patent.  Patented June 28, 1910.

Application filed November 23, 1908. Serial No. 464,094.

*To all whom it may concern:*

Be it known that I, CHARLES VAN MIDDLESWORTH, of Brooklyn, in the county of Kings and in the State of New York, have invented a certain new and useful Improvement in Expansible Bearings, and do hereby declare that the following is a full, clear, and exact description thereof.

My invention relates to an expansible bearing, and especially to a roller bearing of an expansible nature which is adapted to be used in printing presses of the cylinder type, although my bearing is capable of use in machines of any character to which an expansible bearing might be advantageously adapted.

In the art of printing, it is necessary to adjust the relative positions of the printing cylinder and the impression cylinder to a very exact degree, and to so construct the parts that they may be maintained in this carefully adjusted position. In order to effect this end, I have provided one of said cylinders with a pair of roller bearings, one of said bearings being loosely carried by each end of the cylinder. These bearings are so constructed that they may be readily at any moment adjusted so as to cause them to expand, thus increasing their circumference and diameter, and thus moving the cylinders farther apart or in such a manner that the reverse movement can be carried out.

In the accompanying drawings, I have shown one embodiment of my invention, and therein—

Figure 1 is a plan view partly in section of a roller bearing carried upon a shaft or a portion thereof of one of the cylinders in a printing machine; and Fig. 2 is a side view of the same partly in section.

In the drawings, 1 is a sleeve which is adapted to be fixedly attached to the shaft of one of the cylinders in a printing machine, said sleeve carrying at one end a gear 2 for driving the shaft or cylinder and at the other end an annular guard 3 attached to the sleeve 1 by means of screws 4. The guard 3 is designed to retain an annular bearing member 5 upon the sleeve 1, upon which it is loosely carried. The annular bearing member 5 is screw-threaded at 6 at one end thereof, and is provided with a conical surface 7 at the other end. The screw-thread 6 is designed to carry an annular complementarily screw-threaded member 8 which has a series of holes 9 in its periphery, so as to permit the same to be readily rotated by a tool of the ordinary character. Situated upon the conical surface 7 and adjacent to the inner surface of the annular member 8 there is a wedging ring 10 which is split in a diagonal direction at 11 for a purpose to be hereinafter described. The inner surface of the wedging ring 10 is beveled to fit closely over the conical surface 7, while the outer surface 12 of the wedging ring is cylindrical to provide a proper bearing surface for the other cylinder of the printing machine.

In the operation of the device, it will be seen that when a proper tool is caused to engage one of the holes 9, the annular member 8 may be rotated as a consequence, thereby permitting the movement of the wedging ring 10 so as to either cause the increase or decrease of the diameter of the bearing, as may be desired. The ring being diagonally split at 11 permits the variation of the diameter of the bearing referred to. It will be seen that while this is a very simple construction, it is, nevertheless, a very effective one and one that is easy to operate to effect an extremely accurate adjustment of the diameter of the bearing.

While I have described my invention above in detail, I wish it to be understood that many changes in the details and applications of my invention to different structures, may be effected without departing from the spirit thereof.

I claim:—

1. In a device of the character described, the combination of a shaft, a bearing member loosely and rotatably carried thereby having a wedging surface, and an integral split ring having a wedging surface coöperating with the wedging surface of the bearing member to increase the diameter of the bearing.

2. In a device of the character described, the combination of a shaft, a bearing member loosely and rotatably carried thereby having an outer wedging surface, and an integral split ring having an inner wedging surface coöperating with the outer wedging surface of the bearing member to increase the diameter of the bearing.

3. In a device of the character described, the combination of a shaft, a bearing member loosely carried thereby having a wedging surface, and an integral split ring having a wedging surface coöperating with the wedging surface of the bearing member to increase the diameter of the bearing, said ring being split at an angle of substantially 45° to the axis thereof.

4. In a device of the character described, the combination of a shaft, a bearing member loosely carried thereby having a wedging surface and an integral split ring having a wedging surface coöperating with the wedging surface of the bearing member to increase the diameter of the bearing member, said ring being split at an angle of substantially forty-five degrees to the axis thereof.

In testimony that I claim the foregoing I have hereunto set my hand.

CHARLES VAN MIDDLESWORTH.

Witnesses:
    CHARLES M. SAALBURG,
    A. R. RICHARDS.